May 8, 1962  A. G. VANDERBECK  3,033,300
COMPACT TRACTOR ASSEMBLY
Filed Jan. 12, 1961  2 Sheets-Sheet 1

INVENTOR
ALFRED G. VANDERBECK
BY
W. H. Bender
ATTORNEY

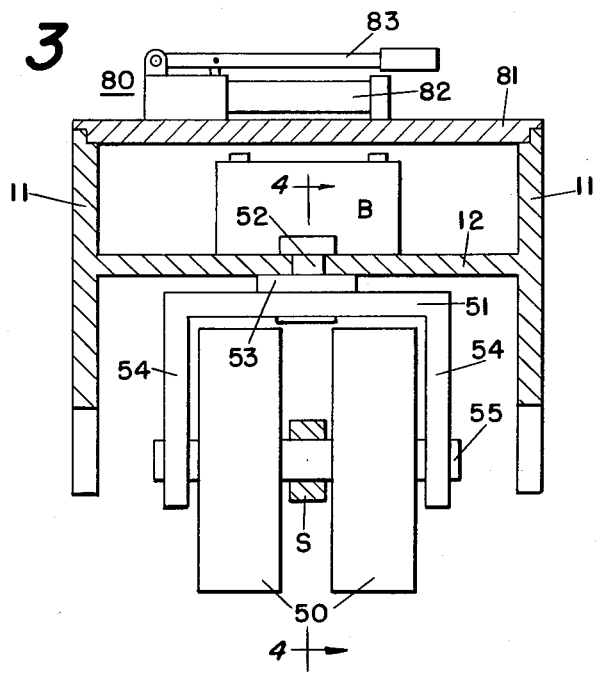
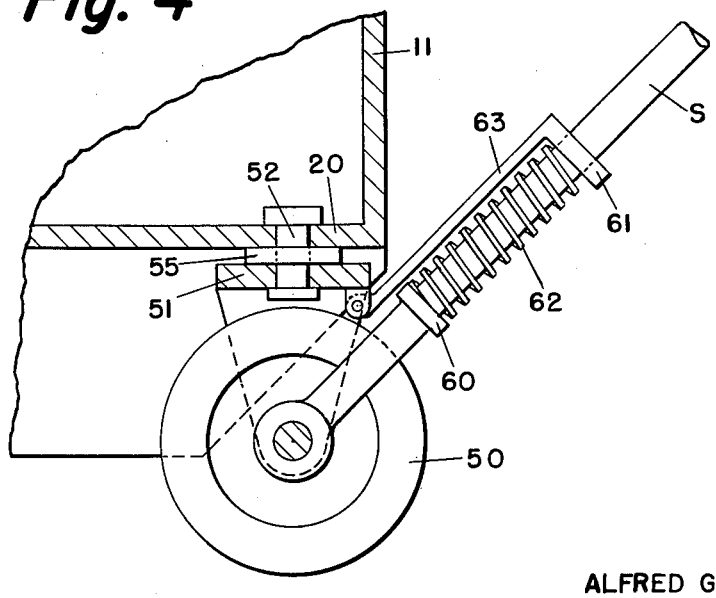

United States Patent Office 3,033,300
Patented May 8, 1962

3,033,300
COMPACT TRACTOR ASSEMBLY
Alfred G. Vanderbeck, 730 Laurel Lane,
Colonial Village, Pa.
Filed Jan. 12, 1961, Ser. No. 82,317
5 Claims. (Cl. 180—14)

The present invention relates to battery energized motor driven wheeled tractor units which are particularly used for moving carts, trucks, dollies and the like from place to place.

The primary object of the invention is to provide a motor driven wheeled unit incorporated in a single compact small dimensioned structure.

Another object of the invention is to provide a motor driven wheeled unit for moving carts, trucks and the like under complete control of an operator.

A further object of the invention is to provide a motor driven wheeled unit arranged for automatically attaching to and detaching a vehicle from the unit.

A still further object of the invention is to provide a motor driven wheeled unit which is comprised of few parts and is yet effective to handle relatively large loads.

Other objects and advantages will become apparent from the following description when considered in the light of the attached drawings, in which:

FIGURE 3 is a vertical sectional view, taken on line 3—3 of FIGURE 1, looking in the direction of the arrows and with several elements, shown in FIG. 1, removed for clarity.

FIGURE 4 is a vertical sectional view taken on the line 4—4 of FIGURE 3, looking in the direction of the arrows.

Figure 1:
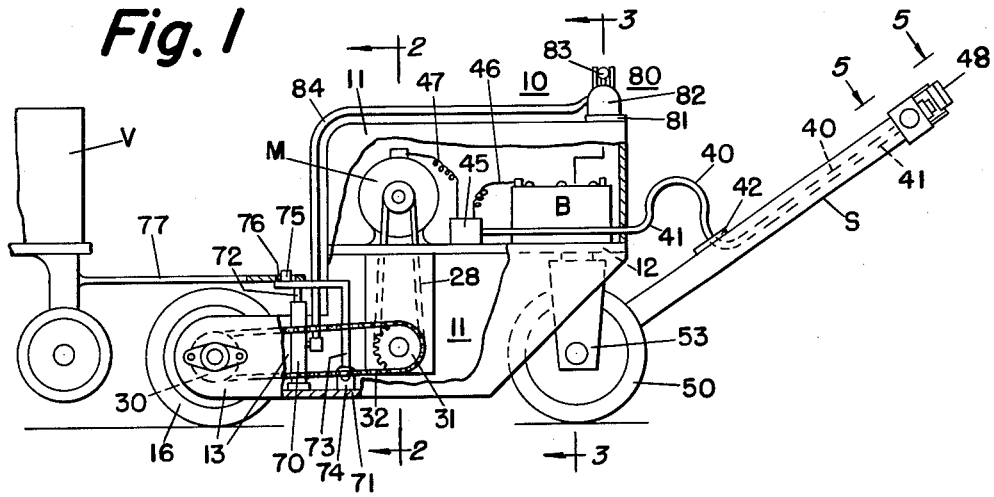
FIGURE 1 is a view in elevation of the motor driven unit of the invention assembled with a vehicle to be moved, the unit having a portion of one side removed for the purpose of clarity.
Figure 2:
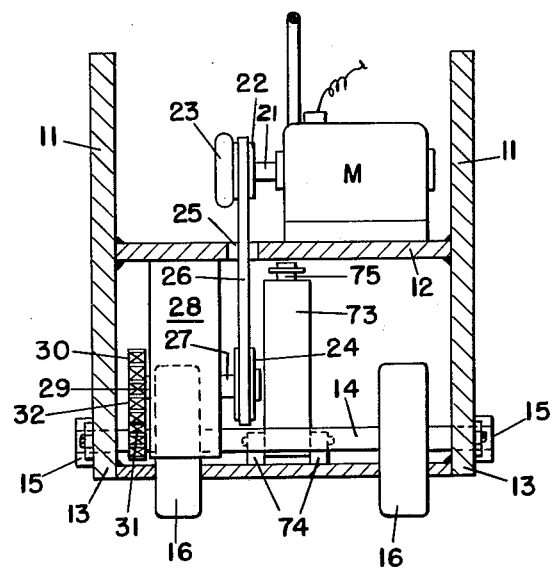
FIGURE 2 is a vertical sectional view, taken on line 2—2 of FIGURE 1, looking in the direction of the arrows and with several elements, shown in FIG. 1, removed for clarity.

Referring now to the drawings wherein like reference characters indicate like parts throughout the several figures, the reference character 10 indicates the tractor unit generally and constructed in accordance with the invention. The various elements of the unit are mounted on or supported by a frame which is H-shaped in vertical cross section as shown in FIG. 2 having similar vertical sidewalls 11—11, and a horizontal partition 12 which forms upper and lower sections and provides a support on which certain of the components of the unit are positioned while others depend therefrom. The side walls 11—11 are irregular in shape, as shown in FIG. 1, and each has a narrow extension 13 rearwardly of and below the partition 12. The extensions 13—13 mount a drive axle 14 therebetween and bearing connections 15—15 are provided for the axle 14. A pair of drive wheels 16—16 are fixed to the axle and are driven by an arrangement now to be described.

As shown in FIG. 2, the horizontal partition or support 12 is mounted between the sidewalls 11—11, as by welding, and as shown in FIG. 1 a battery B is positioned on the front portion of the support while a motor M is positioned on the rear portion of the support. The motor M has its drive shaft 21 extending transversely between the sidewalls 11—11 and an upper pulley 22 is secured thereto by a coupling means 23 which, for example, may be of the shot coupling type. Aligned vertically with the upper pulley 22 is a lower pulley 24 positioned below the partition or support 12 which is slotted at 25 through which a V belt 26 extends and interconnects the upper and lower pulleys. The lower pulley 24 is supported by a shaft 27 extending from one side of a reducer 28 which is fixedly mounted to the partition or support 12 to depend therefrom and has a second shaft 29 extending from its other side and supporting an inner sprocket 31. An outer sprocket 30 is fixed to the axle 14 and is connected with the inner sprocket 31 by a chain 32. The drive wheels 16—16 are thus driven by the motor M through the pulley and sprocket arrangement just described, the reducer 28 having therein suitable reduction gears (not shown) for varying the driving speed.

Figure 5:
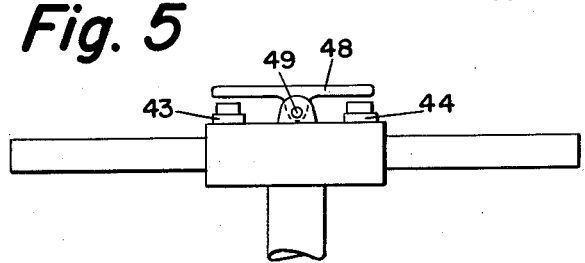
FIGURE 5 is a sectional view taken on the line 5—5 of FIGURE 1, looking in the direction of the arrows.

The motor M is of the reversible type and the unit 10 is driven in the forward or reverse direction as desired by an operator by manipulation of controls located on the steering shaft S. To this end, a pair of cables 40—41 preferably extend longitudinally through the shaft S as shown between a junction 42 and switch buttons 43 and 44 shown in FIG. 5, one of the buttons being connected to operate the unit in its forward movement and the other being connected to operate the unit in its reverse movement. Solenoids are provided for this purpose and are located in a housing 45 which is positioned on the support 12 and the solenoids are connected with the battery by conductor means 46 and connected with the reversible motor M by other conductor means 47. The cables 40 and 41 extend from the junction 42 and are connected with the solenoids in housing 45 and the motor is operated in the desired direction by manipulation of the buttons 43 and 44. Manipulation of the buttons is effected through a safety toggle 48, shown in FIG. 3, which prevents both buttons from being operated simultaneously, the toggle 48 being pivoted at 49 to a lug extending from the cross piece of the steering shaft S.

The steering wheels of the unit are indicated at 50—50 and as shown in FIG. 3 are mounted to the support 12 by means of a clevis 51 which has a swivel connection 52 extending through a suitable aperture in the support 12 and a bearing washer 53 is positioned between the support and bracket. The clevis arms 54—54 mount an axle 55 therebetween and the steering wheels 50—50 are mounted on the axle and the wheel and axle assembly suitably arranged to be driven by the drive wheels 16—16.

The inner end of the steering shaft S is pivotally mounted on the axle 55 between the wheels 50—50 as shown in FIG. 3, and as shown in FIG. 4 a flange 60 is provided on the shaft S and forms an abutment which coacts with a movable ring 61 to embrace a spring 62, the ring having an arm 63 extending therefrom and pivotally mounted to the bracket 51 to permit limited movement of the ring and maintain the spring in tension to position the shaft S for convenient use by an operator.

The details of a preferred arrangement for automatically attaching and detaching a vehicle V to the unit 10 is shown in FIG. 1. This consists of a cylinder 70 which is mounted on a brace 71 extending transversely of the extensions 13—13 and a piston 72 within the cylinder for actuating an L-shaped release lever 73. The lever 73 is pivotally mounted forwardly of the cylinder 70 to a lug 74 on the brace 71 and has its short leg positioned, as shown, in abutting relation with the piston 72. A vertical pin 75 extends upwardly from the lever for reception in an aperture 76 provided in the tongue 77 of a vehicle. The pin 75, as shown in FIG. 1, is positioned rearwardly of the cylinder 70 a short distance in order to increase the leverage and permit the pin to be properly received in the aperture 76 for attachment of the tongue 77 and to provide adequate movement to permit release of the tongue when desired. The pivotal connection of the lever 73 forwardly of the cylinder 70 is to insure that the connection between the pin and tongue is not affected by the weight of the vehicle. The piston is operated manually by means of a hydraulic jack 80 which may as shown be positioned on a brace 81 extending across the upper edge of side walls 11—11 of the frame as shown in FIGS. 1 and 3. The jack 80 is a commercial item and is made up of an hydraulic reservoir 82 and a pump handle 83, the reservoir being in communication by means of a flexible hose 84 with the cylinder 70 for actuating the pivoted lever 73 as heretofore explained for attaching to and releasing the vehicle tongue 70 from the tractor unit 10.

The tractor unit 10 of this invention is of exceptionally small dimensions for the vehicle loads it is capable of moving. The overall length, width and height of the unit being somewhat less than 2 feet, but the various components of the unit are arranged on the support 12 in such a manner as to provide a well balanced structure. The particular position of the cylinder-piston assembly structure 70 and 72 and the particular manner of pivoting the release lever 73 are important details of the unit structure in maintaining a vehicle V attached to the tractor unit 10 under loaded conditions.

According to the provisions of the patent statutes, I have explained the principle of my invention, and have illustrated and described what I now consider to represent its best embodiment. However, I desire to have it understood that, within the scope of the appended claims, the invention may be practiced otherwise than as specifically illustrated and described.

I claim:

1. A compact tractor unit which comprises a frame having generally similar vertical sidewalls, a horizontal partition interconnecting the sidewalls and providing therewith upper and lower sections, said partition having a front portion supporting a battery in the upper section and a rear portion supporting a motor in the upper section, conductor means between said battery and motor, each side wall having a rear extension with the upper edges of the extensions being in a plane below the plane of the partition, a drive axle carrying drive wheels and mounted between said extensions, mechanical driving connections between said motor and drive axle, a transverse brace between said extensions forwardly of said drive wheels, a fluid cylinder and piston assembly mounted on said brace and extending vertically thereof, a clevis having a swivel connection with said front portion of the partition providing arms depending from the partition, a driven axle carried by said arms and mounting a pair of spaced steering wheels, a fluid pump supported by the frame and conduit means between said pump and cylinder for manually operating the piston coupling means comprising a lever having a lower portion pivoted to said brace and an upper portion positioned above and adjacent the upper end of the piston to be actuated thereby and said upper portion of the lever having a pin extending upwardly therefrom.

2. A tractor unit as in claim 1, further characterized by said coupling means comprising a lever having a vertical arm pivotally mounted to said transverse brace forwardly of the piston cylinder assembly with a generally horizontal arm disposed above and adjacent the upper end of the piston to be actuated thereby and a vertical pin extending upwardly from said horizontal arm.

3. A tractor unit as in claim 1, further characterized by a second transverse brace between the upper edges of the sidewalls and adjacent the front edge thereof providing a support for said fluid pump for ready manipulation by an operator steering the vehicle.

4. A compact tractor assembly comprising a frame formed of vertical side walls interconnected by a horizontal partition, a power unit including a motor disposed on said partition, steering wheel means below and operably mounted adjacent one end of the partition, each side wall having a lower portion extending beyond the other end of the partition, a drive axle carrying drive wheels and mounted between said lower portions, driving connections between the motor and drive axle for rotating the drive wheels, a transverse support secured adjacent the lower edges of said side walls and positioned inwardly of and adjacent the drive wheels, a fluid actuated cylinder and piston assembly mounted on said support and extending upwardly therefrom, coupling means comprising a lever having a lower portion pivotally mounted on said support and an upper portion positioned above and adjacent the upper end of the piston to be actuated thereby and said upper portion of the lever having a pin extending upwardly therefrom.

5. A compact tractor assembly comprising a frame formed of vertical side walls interconnected by a horizontal partition, a power unit including a motor disposed on said partition, steering wheel means below and operably mounted adjacent one end of the partition, a drive axle carrying drive wheels and mounted below the partition and adjacent its other end, driving connections between the motor and drive axle for rotating the drive wheels, a transverse support secured adjacent the lower edges of said side walls and positioned inwardly of the drive wheels, a fluid actuated cylinder and piston assembly mounted on said support and extending upwardly therefrom, coupling means comprising a lever having a lower portion pivotally mounted on said support and an upper generally horizontal portion positioned to be contacted by said piston, said upper portion of the lever extending toward said drive wheels and having a pin on its upper face for engaging an opening in a trailer tongue whereby pivotal movement of the lever toward the drive wheels causes the pin to be readily released.

References Cited in the file of this patent

UNITED STATES PATENTS

| | | |
|---|---|---|
| 2,956,631 | Ulinski | Oct. 18, 1960 |
| 2,959,425 | Rogant | Nov. 8, 1960 |
| 2,962,105 | Simbulan | Nov. 29, 1960 |